Sept. 20, 1971 C. C. FAUST 3,606,077
SHAPED SEAL CLOSURE
Filed July 23, 1969

INVENTOR
CLIFFORD C. FAUST
BY
ATTORNEY

United States Patent Office

3,606,077
Patented Sept. 20, 1971

3,606,077
SHAPED SEAL CLOSURE
Clifford C. Faust, Riverside, Ill., assignor to Union
Carbide Corporation, New York, N.Y.
Filed July 23, 1969, Ser. No. 843,921
Int. Cl. B65d 7/42
U.S. Cl. 220—66                                                          8 Claims

ABSTRACT OF THE DISCLOSURE

A shaped seal closure for a thermoplastic tubing comprises a diaphragm membrane extending across the tubing and integral with said tubing, and a trough integral with the tubing and coextensive with said tubing. The trough serves as a support and guide for a coupler, a needle or the like which will perforate the diaphragm.

---

This invention relates generally to a shaped seal closure for a thermoplastic tubing. More particularly, it relates to a shaped seal closure for thermoplastic tubes which are attached to thermoplastic, flexible containers used for collecting, storing and dispensing blood and similar viable fluids. The interior of the containers and of the tubes as well as the fluids, must be kept sterile.

In order to be kept sterile, the tubes may be conventionally sealed by a transverse heat seal extending across the end of the tubes. The disadvantage of such heat seals is that they are not easy to puncture with a cannula, coupling tube, or the like, used for coupling and establishing communication with a fluid conducting element. Furthermore, it is not easy to align the cannula and there is the possibility that it can slip out of position and contact non-sterile portions of the tube or of the container or the fingers of the person inserting the cannula into the tube. To overcome these disadvantages, it has been suggested that puncturable diaphragms of thermoplastic material be positioned within the tubes and sealed across them at a short distance from their end. The cannula is inserted into the end portion of the tubes which serves as a guide for it. While this structure is an improvement over the transverse end seals, it has the disadvantage that the cannula or the coupling tube must be of a size small enough to be readily inserted into the sealed thermoplastic tube. Furthermore, the positioning and sealing of the transverse diaphragm within the tube is a rather cumbersome operation.

Therefore, it is an object of the invention to provide a shaped seal closure for a thermoplastic tube which comprises a diaphragm extending transversely of the tube and integral therewith, whereby the operations of inserting and positioning into a tube a separate diaphragm and sealing it within the tube are eliminated.

It is another object of the invention to provide a shaped seal closure for a thermoplastic tube which comprises a diaphragm closing the tube and a guide to said diaphragm for a cannula, a coupling tube or the like, which guide is integral with the thermoplastic tube and is capable of accommodating a cannula or a coupling tube of different sizes.

It is a further object of the invention to provide a method for producing the shaped seal closure.

The invention by means of which these objects are achieved will be described with reference to the accompanying drawing wherein.

The shaped seal closure of the invention comprises a diaphragm extending across and closing a thermoplastic tube and integral with the tube and a trough integral with the closed tube and forming an extension of said tube near the diaphragm. The trough serves as a support and guide for the cannula, coupling tube or the like, which will perforate the diaphragm. The trough being an open channel, as opposed to the prior art tubes, acts as a support and guide for a cannula, coupling tube, needle or the like, while protecting the fingers of the user.

The diaphragm is formed with the wall of the tube itself, as will later be explained. The trough is of thermoplastic material and may either have been formed as a separate part and sealed to the tube and thus made integral with said tube, or be formed, together with the diaphragm, of a wall portion of the tube itself which has been collapsed and inverted into a diametrically opposite, uncollapsed wall portion of said tube and sealed thereto. In a preferred embodiment of the invention, the diaphragm extends substantially perpendicular to the longitudinal axis of the tube and is cup-shaped.

Figure 1:
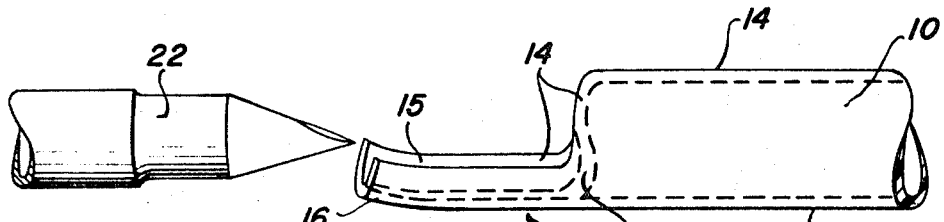
FIG. 1 is a side elevational view of an end portion of a thermoplastic tube provided with a shaped seal closure according to an embodiment of the invention.

Referring to the drawings, there is shown in FIG. 1 an end portion of a thermoplastic tube 10 provided with a shaped seal closure according to a first embodiment of the invention and generally indicated at 12. The tube 10 has two diametrically opposite wall portions 14 and 16, respectively. The shaped seal closure 12 comprises two parts integral with each other and with the tube 10, i.e., a trough 15 formed of an extremity of the wall portion 14 which has been collapsed and inverted into the diametrically opposite, uncollapsed wall portion 16, mated therewith and sealed thereto. An end of the collapsed wall portion 14 extends transversely across the tube 10 to form a diaphragm 20, which has been preferably cup-shaped, as will later be explained.

A cannula 22 may then be easily inserted into the trough 15 and supported and guided by said trough to the diaphragm 20 which it will perforate to establish the desired fluid connection.

Figure 2:
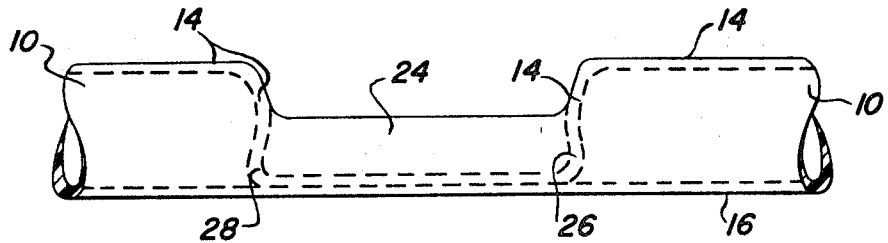
FIG. 2 is a side elevational view of an intermediate portion of a thermoplastic tube provided with a shaped seal closure according to another embodiment of the invention.

In FIG. 2, there is shown another embodiment of the shaped seal closure 12 which has been formed into an intermediate portion of the thermoplastic tube 10. As in the first embodiment, a trough 24 has been formed by collapsing the wall portion 14 of the tube 10 into the uncollapsed diametrically opposite wall portion 16, mated therewith and sealed thereto. Since the trough has been formed in an intermediate portion of the tube 10, rather than at its extremity as in the first embodiment, the collapsed wall portion 14 has two ends extending transversely across the tubing 10, forming two diaphragms 26 and 28, respectively, between which the trough 24 extends. As illustrated in FIG. 2, the diaphragms are preferably cup-shaped. The trough 24 may thereafter be cut in two, to obtain two separate tubes having the shaped seal closure of the invention at the end thereof, as shown in FIG. 1. Alternatively, the trough 24 may be made long enough to receive two cannulas and each of the diaphragms 26 and 28 will be perforated by one of the cannulas, thus permitting dual fluid connection between the tube 10 and other fluid containers, not shown. The shaped seal closure of the invention may thus be made at predetermined spaced interavls on long lengths of tubing and, if desired, may be produced in line with the tubing itself.

Figure 3:
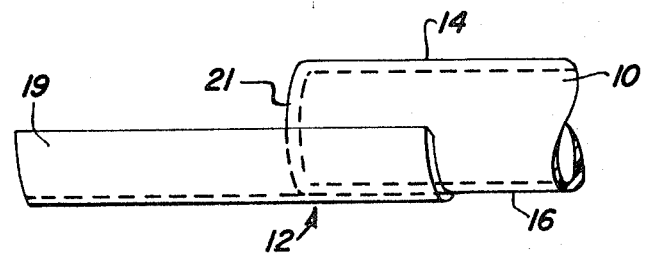
FIG. 3 is a side elevational view of an end portion of a thermoplastic tube provided with a shaped seal closure according to a further embodiment of the invention.

In FIG. 3, there is shown a further embodiment of the shaped seal closure of the invention. A diaphragm 21 closing the end of the tube 10 has been formed across it by sealing together the wall portions 14 and 16. A trough 19 of the thermoplastic material has been preformed in any manner known to those skilled in the art, for example, by cutting it out of a thermoplastic tube. The trough 19 is heat-sealed to the wall 16 of the tube 10 and thus made integral with said tube. The diaphragm 21 may be cup-shaped, if desired.

Figure 4:
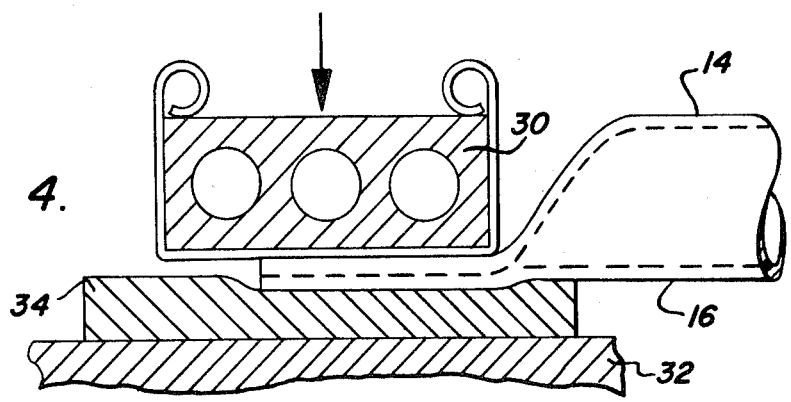
FIGS. 4 and 5 are elevational views partially in cross section of parts of an apparatus for making the shaped seal closure shown in FIG. 1.
Figure 5:
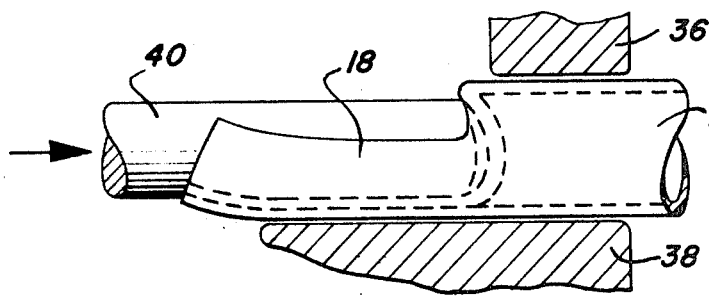

FIGS. 4 and 5 illustrate the production of the shaped seal closure of FIG. 1. In FIG. 4, there is shown an end portion of a tube 10 of thermoplastic material. An extremity of the wall portion 14 has been collapsed into the diametrically opposite, uncollapsed wall portion 16. The wall portions 14 and 16 are clamped between a heat seal bar 30 in contact with the collapsed wall portion 14, and a platen 32 preferably provided with a resilient cushion 34 supporting the uncollapsed wall portion 16. The wall portions 14 and 16 are heat sealed to each other, in a manner known to those skilled in the art. Upon release of the heat seal bar 30, the edges of the clamped, sealed portion of the tube 10 curve upward where a trough 18 is formed.

FIG. 5 illustrates the shaping of the diaphragm. The extremity of the tube 10, with the trough 18 formed therein as above explained, is positioned between a pair of lips 36 and 38 of a seal-forming die. A plunger 40, preferably having a spherical end, is urged into the trough 18 and applied against the end of the wall 14 extending transversely across the tube 10 to shape and the end of the collapsed wall into a cup-shaped diaphragm closing the tube 10 and extending substantially perpendicular to the longitudinal axis of the tube. The plunger 40 may be heated, if necessary for the shaping operation. It is obvious that the diaphragm 21 shown in FIG. 3 may be cup-shaped in the same manner.

The shaped seal closure illustrated in FIG. 2 may also be formed in the manner shown in FIGS. 4 and 5. In this case, an intermediate portion, rather than the end portion, of the tube 10 is clamped between the heat seal bar 30 and the platen 32 to produce the trough 24. The diaphragms 26 and 28 are thereafter shaped by the plunger 40.

The advantage of providing a tube of thermoplastic material with a shaped seal closure according to the invention will be illustrated by the following example.

EXAMPLE

Shaped seal closures according to the embodiment illustrated in FIG. 1 were made in several polyethylene tubes having an internal diameter of 0.210 inch and a wall thickness of 0.018 inch.

The seal closures were made with the apparatus illustrated in FIGS. 4 and 5. The upper heat seal bar was heated to a temperature of 440° F. The lower platen (not heated) was provided with a resilient rubber cushion having a thickness of 1/8 inch. The end portion of each one of the tubes was clamped between the heat seal bar and the rubber cushion and subjected to a pressure of 12 to 15 lbs. per sq. in. for a heat sealing time of 2 seconds. As a result of this combined heat and pressure step, the wall portion of the tube in contact with the heat seal bar had been collapsed and inverted into the diametrically opposite wall portion, and heat sealed thereto and an end of the collapsed wall portion extended across the tube and formed a diaphragm integral with the tube and closing it.

Upon release of the heat seal bar, the edges of the collapsed sealed end portion of the tube curved upward and a trough integral with the tube and with the diaphragm was thus obtained.

The end portion of each tube with the trough therein was then positioned between the lips of the seal-forming die and the plunger was urged into the trough and applied against the end of the wall extending transversely across the tube. The plunger had a spherical end and a cup-shaped diaparagm closing the tube and perpendicular to its longitudinal axis was formed under the action of the plunger.

Cannulas different sizes were used to perforate the diaphragms. In each instance the cannula was easily guided by the trough to the diaphragm and readily inserted into the tube.

What is claimed is:

1. A shaped seal closure for a thermoplastic tubing, which seal closure comprises a diaphragm extending across and closing said tubing, said diaphragm being substantially perpendicular to the longitudinal axis of said tubing and being integral therewith, and a trough forming an extension of said closed tubing beyond said diaphragm.

2. A closure as claimed in claim 1, in which the trough is sealed to an extremity of the tubing closed by said diaphragm.

3. A closure as claimed in claim 1 in which said trough is integral with said tubing.

4. A closure as claimed in claim 3, in which the trough is integral with the diaphragm.

5. A closure as claimed in claim 3, in which the trough is a portion of the tubing wall.

6. A closure as claimed in claim 3, in which the trough is made of thermoplastic material.

7. A closure as claimed in claim 3 in which the diaphragm is cup-shaped.

8. A closure as claimed in claim 3, which comprises a pair of spaced diaphragms extending across the tubing and integral therewith and a trough integral with said diaphragms and extending therebetween, said trough being coextensive with the tubing and integral therewith.

References Cited

UNITED STATES PATENTS

| 1,916,474 | 7/1933 | French et al. | 29—422X |
| 2,508,197 | 5/1950 | Singer | 128—272UX |
| 2,803,695 | 8/1957 | Woolley | 29—422UX |
| 3,064,647 | 11/1962 | Earl | 128—272X |
| 3,064,802 | 11/1962 | Jess et al. | 128—272UX |

JOSEPH R. LECLAIR, Primary Examiner

J. R. GARRETT, Assistant Examiner

U.S. Cl. X.R.

53—180; 128—214, 272; 156—198